United States Patent [19]
Tanahashi et al.

[11] 3,839,081
[45] Oct. 1, 1974

[54] ACRYLIC FIBER HAVING A HIGH WATER ABSORBENCY AND A WOOL-LIKE HAND AND PROCESS THEREFORE

[75] Inventors: Kunio Tanahashi; Yukitoshi Nariai, both of Okayama, Japan

[73] Assignee: American Cyanamid Company, Stamford, Conn.

[22] Filed: Aug. 22, 1973

[21] Appl. No.: 390,447

[52] U.S. Cl............... 117/138.8 UA, 117/139.5 A, 117/161 UZ, 117/161 UT, 117/161 UN, 117/161 UC, 260/881
[51] Int. Cl........................ B32b 27/02, B44d 1/02
[58] Field of Search........... 8/115.6; 117/138.8 UA, 117/139.5 A, 161 UZ, 161 UT, 161 UN, 161 UC; 252/8.6; 260/876 R, 874, 881, 898, 29.6 WA

[56] References Cited
UNITED STATES PATENTS

| | | |
|---|---|---|
| 3,393,183 | 7/1968 | Hicks et al.............. 260/86.1 |
| 3,525,723 | 8/1970 | Masuda et al............ 260/85.7 |
| 3,644,584 | 2/1972 | Fryd..................... 260/879 |
| 3,755,234 | 8/1973 | Chujo et al............. 260/29.6 |

FOREIGN PATENTS OR APPLICATIONS

| | | |
|---|---|---|
| 665,571 | 6/1963 | Canada |
| 871,192 | 6/1961 | Great Britain |
| 718,137 | 11/1954 | Great Britain |
| 2,947,971 | 11/1971 | Japan |

Primary Examiner—Leon D. Rosdol
Assistant Examiner—P. E. Willis
Attorney, Agent, or Firm—William J. van Loo

[57] ABSTRACT

There is disclosed an acrylic fiber of improved water absorbency and wool-like hand comprising a fiber substrate of an acrylonitrile polymer carrying a small but effective amount of a copolymer-grafted saponified polyvinyl acetate backbone, the grafting copolymer comprising acrylonitrile, a long chain ester of an acrylic acid or a vinyl ester of a long chain fatty acid, and, optionally, another vinyl monomer.

10 Claims, No Drawings

ACRYLIC FIBER HAVING A HIGH WATER ABSORBENCY AND A WOOL-LIKE HAND AND PROCESS THEREFORE

This invention relates to an acrylic fiber improved in water absorbency while at the same time possessing wool-like hand characteristics. More particularly, the invention relates to such a fiber comprising a fiber substrate of an acrylonitrile polymer carrying an effective amount of a saponified polyvinyl acetate grafted to have a copolymer sidechain of acrylonitrile, a long chain alkyl ester of an acrylic acid or a vinyl ester of a long chain fatty acid, and, optionally, another vinyl monomer.

Acrylic fibers possess bulkiness and softness properties that resemble those of wool and give rise to potential use in applications where wool is used, such as underwear garments. However, acrylic fibers evaluated in underwear applications were found to have coarse and harsh hand characteristics and to lack the typical hand characteristics which make wool acceptable for such use. Accordingly, acrylic fibers contemplated for use in underwear applications are generally treated with softening agents which improve their surface characteristics.

One method for modifying the surface characteristics of acrylic fibers is to treat the surface thereof with a copolymer of 4 to 30 mol percent of a higher ester of an acrylic acid or a vinyl ester of a higher fatty acid and 70 to 96 mol percent of acrylonitrile or another vinyl monomer. Although such procedure provides acrylic fiber that has a durable wool-like hand, the fiber lacks adequate water absorbency and underwear made therefrom are uncomfortable to wear. Thus, there exists the need for acrylic fiber suitably modified to provide the desired water absorbency in conjunction with the wool-like hand characteristics.

In accordance with the present invention, there is provided an acrylic fiber of improved water absorbency and wool-like hand which comprises a fiber substrate comprising an acrylonitrile polymer of at least 70 weight percent acrylonitrile and any balance of one or more monomers copolymerizable therewith and carried on said substrate from about 0.5 to 3.0 weight percent, based on the weight of said substrate, of a graft polymer comprising a backbone of a polyvinyl acetate saponified to the extent of at least 70 mol percent and a sidechain copolymer of from about 70 to 92 mol percent of acrylonitrile from about 8 to 30 mol percent of an unsaturated long chain ester which is of a structure selected from $CH_2=C(R_1)COOR_2$ and $CH_2=CHOCOR_3$ wherein $R_1$ is hydrogen or methyl and $R_2$ and $R_3$ are individually selected from alkyl groups of 10 to 18 carbon atoms, from about 0 to 22 mol percent of another vinyl monomer copolymerizable therewith, the ratio of backbone polymer to sidechain copolymer being in the range of about 0.1:1.0 to 0.5:1.0, respectively, and said backbone having a degree of polymerization of from about 500 to 2,500.

There is also provided a process for preparing the above fiber which comprises applying to a fiber substrate of an acrylonitrile polymer of at least 70 weight percent acrylonitrile and any balance of one or more monomers copolymerizable therewith from about 0.5 to 3.0 weight percent based on the weight of said substrate of a graft polymer comprising a backbone of a polyvinyl acetate saponified to the extent of at least 70 mol percent and having a degree of polymerization of from about 500 to 2,500 and a sidechain copolymer of from about 70 to 92 mol percent acrylonitrile, from about 8 to 30 percent of an unsaturated long chain ester which is of a structure selected from

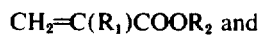 and

wherein $R_1$ is hydrogen or methyl and $R_2$ and $R_3$ are individually selected from alkyl groups of 10 to 18 carbon atoms, and from about 0 to 22 mol percent of another vinyl monomer copolymerizable therewith and thereafter drying said substrate.

Acrylic fiber modified with the graft copolymer of the present invention not only has the desirable wool-like hand characteristics desired but also has sufficient water absorbency to provide comfortable wearing characteristics in underwear applications, both property modification being durable to laundering.

Contrary to the results achieved by the present invention, two alternatives are possible. One alternative is that of obtaining a durable wool-like hand without adequate water absorbency by use of a copolymer of acrylonitrile, unsaturated long chain ester, and optional vinyl monomer. The other alternative is that of obtaining increased water absorbency of non-durable character by use of a saponified polyvinyl acetate. Neither of these alternative provides the necessary fiber properties that promotes use of acrylic fibers in underwear and related applications.

The comfort factor which is important in underwear applications is influenced both by hand or feel characteristics of the fiber as well as water absorbency of the fiber. The water absorbency should be adequate to deal with body perspiration problems. If the fiber lacks sufficient water absorbency to deal with normal body perspiration, discomfort in wearing apparel from such fiber is evidenced. Accordingly, there is a direct relationship between water absorbency of a fiber and the comfort factor associated therewith in underwear applications. Thus, the present invention not only provides the characteristic wool-like feel that is important for comfort in wearing but also provides adequate water absorbency that is also important for comfort in underwear and related garments.

In accordance with the present invention, it is important that the saponified polyvinyl acetate forming the backbone of the graft polymer be saponified to the extent of at least about 70 mol percent and have a degree of polymerization in the range of about 500 to 2,500. Commercially available polyvinyl acetates have the necessary degree of polymerization and saponification and are useful.

The copolymer composition forming the grafting sidechain on the saponified polyvinyl acetate backbone must also have the specific composition given to provide the results desired. The sidechain copolymer must be derived from 70 to 92 mol percent of acrylonitrile and from 8 to 30 weight percent of an unsaturated long chain ester. In addition the sidechain copolymer may be derived from 0 to 22 mol percent, as needed, of another vinyl monomer without adverse effect on the properties imparted by the backbone with its sidechain copolymer. When the amount of unsaturated long-chain ester used in preparing the sidechain copolymer is less than about 8 mol percent, the wool-like hand characteristics will not be adequately obtained and when it exceeds 30 mol percent, durability will be reduced and an undesirable tacky feel will result. When the amount of acrylonitrile used in preparing the sidechain copolymer is below about 70 mol percent, adhesion of the graft polymer to the fiber will be poor and durability will be inadequate. When the amount of acrylonitrile exceeds about 92 mol percent, the wool-like hand characteristics will be impaired.

In addition to the composition of the sidechain copolymer and backbone polymer, it is necessary that the ratio of sidechain copolymer to backbone polymer be in the specific ratio given by the range 0.1:1.0 to 0.5:1.0, respectively. If the ratio is lower than that indicated, the improvement in water absorbency will be inadequate. If the ratio is higher than that indicated, the desired wool-like hands will not be obtained.

As the unsaturated long chain esters that may be used in preparing the sidechain copolymer, two types are useful. One type includes higher alcohol esters of an acrylic acid and are represented by the structure $CH_2=C(R_1)-COOR_2$ wherein $R_1$ is hydrogen or methyl and $R_2$ is an alkyl group of 10–18 carbon atoms. Exemplary are undecyl, dodecyl, hexadecyl, and octadecyl alcohol esters of acrylic and methacrylic acids. The second type includes vinyl esters of higher fatty acids and are represented by the structure $CH_2=CH-O-COR_3$ wherein $R_3$ is an alkyl group of 10–18 carbon atoms. Exemplary are vinyl alcohol esters of lauric, palmitic, and stearic acids. When the long chain alkyl groups of the two monomer types has less than about 10 carbon atoms, the wool-like hand characteristics are not suitably provided. When the long chain alkyl group of the two monomer types exceeds about 18, the compounds are difficult to procure and to copolymerize.

As the optional comonomer forming the sidechain copolymer, there can be used well known ethylenically unsaturated compounds that are conventionally employed in copolymerizations with acrylonitrile. Exemplary are unsaturated acids such as acrylic, methacrylic, and itaconic acids and their salts and alkyl or aryl esters; sulfonic acid derivatives such as allylsulfonic acid, methallylsulfonic acid, and styrenesulfonic acid and their salts; neutral monomers such as acrylamide, styrene, vinyl chloride, vinylidene chloride, and methylacrylonitrile; basic monomers such as vinylpyridine and dimethylaminoethyl methacrylate; and crosslinkable monomers such as N-methylolacrylamide and glycidyl methacrylate.

The graft copolymerization of a suitable monomer mixture on the backbone saponified polyvinyl acetate is carried out in accordance with conventional procedures, such as solution, suspension, and emulsion polymerizations. It is preferred to employ an emulsion polymerization technique since the product obtained need merely be diluted for use in fiber modification. The emulsifier may be of the nonionic or anionic types or a mixture thereof.

The graft polymer may be applied to the fiber as a diluted emulsion in water or as a solution in suitable solvent. The fiber may be sprayed, coated, or impregnated with the graft polymer in appropriate medium according to conventional procedures. Generally, it is desirable to apply from about 0.5 to 3.0 weight percent, based on the weight of fiber, of graft copolymer to the fiber. Outside this range of graft polymer usage the desirable combination of fiber improvements are not achieved.

The graft polymer may be applied to fiber per se or to intermediates, such as yarn, or fiber products, such as apparel. A preferred procedure for applying the graft polymer is to a swollen wet-gel fiber obtained by wet-spinning prior to collapsing of the fiber structure. By this means, penetration of the graft polymer within the swollen gel occurs and increased durability results. Thus, after an acrylonitrile spinning composition has been extruded into a coagulant and coagulated the graft polymer may be applied in conjunction with washing or stretching or as a separate step subsequent to coagulation but prior to collapsing, or initial drying, which irreversibly compacts the swollen gel structure.

After treating the fiber with the graft polymer in emulsion or solution form, the wet pickup of the fiber is adjusted to deposit an amount of graft polymer in the range specified and the fiber is dried. When the fiber has been treated in swollen wet-get state, drying, which is also necessary to effect compacting, is preferably carried out at a temperature about 90°C. When compacted fiber or fiber products are treated, drying is preferably carried out at a temperature above about 70°C.

As can be readily appreciated, the graft polymer may be present on the fiber as a coating, as a uniform impregnant on the compacted fiber, or as an internal impregnant resulting from treatment of the fiber in swollen wet-gel state. By the term "carrying," as employed herein and in the appended claims, is meant that the fiber substrate contains the graft polymer additive in one of the forms described.

The fiber substrate of the present invention is typically an acrylic fiber spun from an acrylonitrile polymer containing at least 70 weight acrylonitrile and any balance of one or more monoethylenically unsaturated monomers copolymerizable therewith. Such fiber substrates are well known and apparently provide an appropriate cohesive energy density to bound durably the graft polymer.

The invention is more fully illustrated by the examples which follow wherein all parts and percentages are by weight unless otherwise specifically indicated.

EXAMPLE 1

GREAT POLYMER PREPARATION

A polyvinyl acetate which had a degree of saponification of 77.6 mol percent and a degree of polymerization of 1,200 was employed as the backbone polymer. To 48 parts of water were added 2 parts of the saponified polyvinyl acetate to form a solution labeled as Component A.

A mixture of 5 parts of octadecyl acrylate and 5 parts of acrylonitrile were added dropwise to 40 parts of an aqueous solution of 2 percent sodium laurylsulfate with high speed stirring to form a monomer emulsion labeled as Component B.

To a suitable polymerization flask maintained at 40°C. were added components A and B. Potassium persulfate, 0.1 part dissolved in a small amount of water, was added as initiator while nitrogen gas was flowing in the flask. In addition, 0.1 part of potassium persulfate was added, as above, at intervals of one hour for a total of 3 subsequent additions, i.e. a total of 0.4 part. The components were maintained under polymerizing conditions for 6 hours. There was obtained a polymer in yield of about 95 percent and grafting efficiency of 75 percent.

FIBER TREATMENT

A swatch of hosiery knit formed from wet-spun acrylic fiber obtained from a polymer composed of 90 percent acrylonitrile and 10 percent methyl acrylate was dipped into the graft polymer emulsion obtained above. The wet pickup was adjusted by squeezing the knit to provide 1 percent of graft polymer based on the weight of dry fiber. The treated knit was dried at 100°C. for 3 minutes.

The dried treated swatch was washed in a domestic washing machine and evaluated for hand characteristics and water absorbency. The swatch had a highly desirable wool-like hand. Water absorbency was measured in accordance with the Japanese Method designated as JIS-L-1079 (1966). In this method wicking of water by a fabric specimen is measurable as a length in a specified time. The swatch of this example exhibited an absorption length of 30 millimeters after 30 seconds and 50 mm. after 3 minutes.

COMPARATIVE EXAMPLE A

A copolymer was prepared following the procedure of Example 1 except that the backbone polymer, Component A of Example 1, was omitted. The resulting copolymer emulsion was applied to acrylic fiber following the procedure of Example 1.

The treated swatch had a wool-like hand that was essentially the same as that of the swatch of Example 1. The water absorption length of the treated swatch, however, was 0 after 30 seconds and less than 5 millimeters after 3 minutes.

A comparison of the results of Example 1 and comparative Example A indicate the advantage of the graft polymer in providing water absorbency.

EXAMPLE 2

GRAFT POLYMER PREPARATION

The procedure of Example 1 was followed in every material detail except that the polyvinyl acetate was completely saponified, i.e., a polyvinyl alcohol polymer was employed. The graft polymer yield was 94 percent and the graft efficiency was 90 percent.

FIBER TREATMENT

The procedure of Example 1 was followed except that the graft polymer of this example was applied to swollen wet-gel fiber immediately following washing. The swollen wet-gel fiber entered a separate bath containing sufficient of the graft polymer to apply 1 percent thereof to the wet-gel fiber based on its dry weight.

The fiber resulting was spun into yarn, dyed, and fabricated into a hosiery knit. The knit swatch exhibited a desirable wool-like hand and water absorption lengths of 42 mm. after 30 sec. and 70 mm after 3 min. Hand and water absorbency were essentially unchanged after a total of 3 washes.

COMPARATIVE EXAMPLE B

A swollen wet-gel fiber was treated as in Example 2 except that the copolymer of Comparative Example A was employed.

A knit swatch, as in Example 2, exhibited a desirable wool-like hand and water absorbencies of only 2 mm after 30 seconds and 8 mm after 3 min.

EXAMPLE 3

Treated fiber obtained by the procedure described in Example 2 was spun into yarn and knitted into pantyhose.

A panel of wearers of the pantyhose all reported ideal comfort and perspiration absorption.

COMPARATIVE EXAMPLE C

Treated fiber obtained by the procedure described in Comparative Example B was spun into yarn and knitted into pantyhose.

A panel of wearers of the pantyhose all reported discomfort from feel and lack of absorbency.

EXAMPLE 4

A series of graft polymers were prepared according to the procedure of Example 1. The backbone polymer was a polyvinyl acetate saponified to the extent of 85 mol percent and having a degree of polymerization of 1,000. The grafting copolymer contained 86 mol percent acrylonitrile and 14 mol percent octadecylacrylate. In the series, the ratio of grafting copolymer to backbone polymer was varied.

The obtained graft polymers were evaluated on hosiery knit as in Example 1. The various ratios of grafting copolymer to backbone polymer studied and results obtained upon evaluation of the hosiery knits treated with the graft polymers are given in Table I.

TABLE 1

EFFECT OF GRAFT RATIO ON PROPERTIES OF TREATED KNIT

| Ratio of Backbone Polymer to Grafting copolymer | 0.05:1 | 0.1:1 | 0.3:1 | 0.5:1 | 0.6:1 |
|---|---|---|---|---|---|
| | RELATIVE PROPERTIES OF TREATED KNIT | | | | |
| Wool-like Hand Characteristics | High | High | High | High | Poor |
| Water Absorbency | Low | High | High | High | High |
| | Comparative | ← This | Invention | → | Comparative |

We claim:

1. An acrylic fiber of improved absorbency and wool-like hand characteristics which comprises a fiber substrate comprising an acrylonitrile polymer of at least 70 weight percent acrylonitrile and any balance of one or more monomers copolymerizable therewith and carried on said substrate from about 0.5 to 3.0 weight percent, based on the weight of said substrate, of a graft polymer comprising a backbone of a polyvinyl acetate saponified to the extent of at least 70 mol percent and a degree of polymerization of from about 500 to 2,500 and a sidechain copolymer of from about 70 to 92 mol percent acrylonitrile, from about 8 to 30 mol percent of an unsaturated long chain ester which is of a structure selected from $CH_2=C(R_1)COOR_2$ and $CH_2=CH-OCOR_3$, wherein $R_1$ is hydrogen or methyl and $R_2$ and $R_3$ are individually selected from alkyl groups of 10 to 18 carbon atoms, and from about 0 to 22 mol percent of another vinyl monomer copolymerizable therewith, the ratio of backbone polymer to side-chain copolymer being in the range of about 0.1:1.0 to 0.5:1.0, respectively.

2. The fiber of claim 1 wherein the fiber substrate comprises an acrylonitrile polymer of 90 weight percent acrylonitrile and 10 weight percent methyl acrylate.

3. The fiber of claim 1 wherein the unsaturated long chain ester is octadecylacrylate.

4. The fiber of claim 1 wherein the fiber substrate is in the form of a hosiery knit.

5. The fiber of claim 1 wherein the backbone of the graft polymer is completely hydrolyzed.

6. A process for preparing the fiber of claim 1 which comprises applying to a fiber substrate of an acrylonitrile polymer of at least 70 weight percent acrylonitrile and any balance of one or more monomers copolymerizable therewith from about 0.5 to 3.0 weight percent, based on the weight of said substrate, of a graft polymer comprising a backbone of a polyvinyl acetate saponified to at least 70 mol percent and having a degree of polymerization of from about 500 to 2,500 and a side-chain copolymer of from about 70 to 92 mol percent acrylonitrile, from about 8 to 30 mol percent of an unsaturated long chain ester which is of a structure selected from $CH_2=C(R_1)COOR_2$ and $CH_2=CHOCOR_3$, wherein $R_1$ is hydrogen or methyl and $R_2$ and $R_3$ are individually selected from alkyl groups of 10 to 18 carbon atoms, and from about 0 to 22 mol percent of another vinyl monomer copolymerizable therewith and thereafter drying said substrate.

7. The process of claim 6 wherein the graft polymer is applied to the fiber substrate while the latter is in the swollen wet-gel state.

8. The process of claim 6 wherein the graft polymer is in emulsion form.

9. The process of claim 6 wherein the fiber substrate comprises an acrylonitrile polymer of 90 weight percent acrylonitrile and 10 weight percent methyl acrylate.

10. The process of claim 6 wherein the unsaturated long chain ester is octadecylacrylate.

* * * * *